(12) United States Patent
Nussbächer (10) Patent No.: US 7,847,821 B2
(45) Date of Patent: Dec. 7, 2010

(54) ON CHIP TEST MODE IMPLEMENTATION

(75) Inventor: Mark Nussbächer, Teck (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 1064 days.

(21) Appl. No.: 11/594,292

(22) Filed: Nov. 8, 2006

(65) Prior Publication Data

US 2008/0106602 A1 May 8, 2008

(30) Foreign Application Priority Data

Nov. 6, 2006 (EP) .................................. 06392013

(51) Int. Cl.
*H04N 17/00* (2006.01)
(52) U.S. Cl. .................. 348/187; 348/180; 348/243
(58) Field of Classification Search ............... 348/187, 348/180, 184, 189, 191, 241–243, 222.1, 348/251, 207.99, 261; *H04N 17/00*
See application file for complete search history.

(56) References Cited

U.S. PATENT DOCUMENTS

| | | | |
|---|---|---|---|
| 4,963,952 A | 10/1990 | Janesick | |
| 5,955,753 A * | 9/1999 | Takahashi | 257/292 |
| 6,326,230 B1 | 12/2001 | Pain et al. | |
| 6,625,558 B1 | 9/2003 | Van Ausdall et al. | |
| 6,737,637 B1 | 5/2004 | Balster et al. | |
| 6,765,610 B1 | 7/2004 | Nakamura | |
| 7,161,626 B1 * | 1/2007 | Nara | 348/243 |
| 7,639,291 B2 * | 12/2009 | Lim et al. | 348/243 |
| 2004/0095488 A1 | 5/2004 | Rambaldi et al. | |
| 2004/0263648 A1 | 12/2004 | Mouli | |
| 2006/0038109 A1 | 2/2006 | Kinney et al. | |

FOREIGN PATENT DOCUMENTS

EP 06392013.6-1241 5/2007

* cited by examiner

*Primary Examiner*—Trang U Tran
(74) *Attorney, Agent, or Firm*—Saile Ackerman LLC; Stephen B. Ackerman (57) ABSTRACT

An improved on chip test method for determining the photon transfer curve (PTC) and dark current in an image sensor is described. Cost and time savings is achieved by reducing the number of frames necessary for the measurements to three including two exposure frames and one frame for dark current testing. A conventional test involving "n" different exposure times each with two frames is replaced by implementing a snap shot mode where a first plurality of pixel rows are exposed for a time $t_1$, a second plurality of pixel rows are exposed for a time $t_2$, and so forth up to an nth plurality of pixel rows exposed for a time $t_n$ where the total number of pixel rows equals a frame and $t_n > t_2 > t_1$. The resulting image has "n" regions each with a different brightness that become progressively brighter from top to bottom of the image.

20 Claims, 4 Drawing Sheets

ON CHIP TEST MODE IMPLEMENTATION

RELATED PATENT APPLICATION

This application is related to the following: Ser. No. 11/784,075, filing date Apr. 5, 2007, assigned to a common assignee.

FIELD OF THE INVENTION

The invention relates to an improved method of testing pixels in a CMOS image sensor. In particular, the time required for photon transfer curve (PTC) testing and dark current testing is reduced and test accuracy is increased by implementing an exposure matrix in a snap shot mode.

BACKGROUND OF THE INVENTION

A complementary metal oxide semiconductor (CMOS) image sensor is a key component of many digital video cameras and other "high tech" devices. The CMOS image sensor is typically comprised of an upper stack that includes one or more layers of color filters and a microlens array, and a lower stack that includes interlevel dielectric layers, interlevel metal layers, and passivation layers that are formed on a substrate. The function of the microlens component is to focus incident light through a light column onto a sensing area (photodiode) at the base of the lower stack. The elementary unit of the image sensor is a pixel which is an addressable area element with intensity and color attributes related in large part to the spectral signal contrast obtained from the photon collection efficiency of the microlens array, light transmission through the color filters, microlenses, and other layers in the imaging path, and the spectral response and efficiency of the photodiode. A pixel converts incident radiation into a quantity of electrical charge that is related to the intensity of illumination. Output signals from a plurality of pixels are used by the image sensor device to generate a picture.

A plurality of pixels forms an array on the substrate wherein pixels sensitive to red light, blue light, or green light are evenly distributed. Ideally, all pixels of a certain color should afford the same output in terms of electrical charge when exposed to the same intensity of incident light. However, process variations during CMOS image sensor fabrication and other factors such as particle defects on the surface of the image sensor cause the output of certain pixels to vary either above or below the desired output range. If a large enough number of the pixels in the array fail to provide an acceptable output signal, the image sensor is rejected. Therefore, pixel arrays are typically tested while still on the chip and before the image sensor is incorporated into a larger device.

Testing is a major cost component of the final image sensor device because of the large number of pixels that must be tested, and the nature of the test which includes both optical and electrical methods. One important test is the so called photon transfer curve (PTC) test where the light sensitivity of an array of pixels in response to incident light is determined. The PTC characterizes the image sensor in many different ways. In order to calculate the read noise, the dynamic range, conversion gain, offset, offset fix pattern noise and the full well, it is necessary to grab frames with different exposure times at a certain illumination. The exposure time or integration time is usually named in number "s" of rows. One row exposure is equivalent to the number of pixels per row multiplied by clock frequency in microseconds. The illumination is chosen in a way such that the sensor reaches saturation (white image, maximum output level) at the longest exposure time.

During the PTC test, a measured amount of broad band light that is highly uniform over the entire exposure field is directed at the pixel array through a point light source. Each pixel has a photo gate (photodiode) at the bottom of its light column that is pre-charged to a certain voltage level. During the time that pixels are exposed, the light photons discharge the photo gate and the intensity of light incident on the photo gate is related to the amount of discharge. The remaining voltage is transferred to a storage node (capacitor) where the voltage stays until the "pixel information" (voltage level) is read out. The read out time is related to exposure time. Normally, the test involves 5 to 10 different illumination levels (different exposure times) and each illumination requires two frames wherein a frame is defined as a certain number of lines (rows) of pixels from an array that consists of "m" rows and "n" columns of pixels. A typical exposure rate of 30 frames per second and the wait times between light intensity changes dictate that the total PTC testing time is about 6 seconds per device. Note that the sequence of illumination, voltage transfer to storage, and read out of data to a frame grabber and ultimately to an image processor can be performed simultaneously for different frames.

A dark current test is also performed for each device. The dark current is the parasitic leakage of the storage node and testing involves resetting the photo gate to a dark state which is equivalent to a condition where there is no illumination of the pixel. Generally, the dark current test requires acquisition of a "dark" frame following each of the 5 to 10 different exposure levels. In other words, to calculate the dark current in $nA/cm^2$, it is typical to have the same frames as for the PTC (fixed illumination, different exposure times). However, it is also necessary to grab one additional frame for each exposure time setting but without illumination. Thus, if 10×2 or 20 frames are needed for the PTC, an additional 10 frames would be required for a typical dark current test. The parasitic leakage may be significant for long read out times (long exposures).

Since common light sources are not programmable and fast switching, it is generally not feasible to vary the illumination (photon flux) during the frame. Moreover, changing the intensity of the light source from one exposure to the next is less accurate than changing the exposure level by varying the time for a fixed illumination. Changing the light intensity will result in intensity differences from one frame to the next of about 1% or less but that variability is enough to produce less accurate calculations than when intensity is kept constant and exposure time is varied. As a result, improvements in PTC and dark current test throughput are limited because of the multiple number of frames required in the standard test method. Therefore, a faster method of testing image sensors and one that has improved accuracy is needed to reduce the cost associated with device fabrication.

In U.S. Pat. No. 6,625,558, a method and apparatus that enable fast testing of light sensing integrated circuits are disclosed. The test involves a low voltage differential signal data transfer link from a test head to an image data interface card in a test signal processor computer. However, the method does not address the lengthy acquisition times necessary for pixel illumination and dark current tests.

A multiphase charge-coupled device is disclosed in U.S. Pat. No. 4,963,952 and has a photosensitive volume bounded by $SiO_2$ layers on the front and back. Dark noise is reduced by applying a different negative bias at the front and back.

An illuminator is described in U.S. Pat. No. 6,737,637 wherein output light from a first integrating sphere is spatially divided and delivered to a plurality of second integrating spheres. The output lights from the second integrating spheres are directed onto active regions of respective image sensors as a means of reducing test time.

An image sensor is described in U.S. Pat. No. 6,326,230 wherein photocharges accumulated in a photoactive region during a pixel integration period are transferred to a sense node during a charge transfer period and are transferred to a power supply node during a third period without passing through the sense node. Exposures may be performed in a rolling shutter mode where the exposure time is 4 rows. This mode involves exposing the first row of pixels, and then with a delay of one row, the second row is exposed. The third row is exposed with a delay of 2 rows and the fourth with a delay of 3 rows. When the fifth row is exposed (delay of 4 rows), the first row is no longer exposed and is read out. When the sixth row is exposed, the second row is read out, and so forth. Thus, each of the pixels per row sees a constant time of 4 rows of exposure.

In U.S. Patent Application Publication US2004/0263648, a method and apparatus are disclosed that identify and compensate for dark current effect in an imaging device. The method includes capturing and storing both dark and white reference images.

U.S. Patent Application Publication US2004/0095488 provides a method for testing pixels by exposing them to known quantities of radiation to correct for defective pixels.

SUMMARY OF THE INVENTION

One objective of the present invention is to provide a method that reduces the time required for a PTC test on an image sensor device and thereby lowers production cost.

A further objective of the present invention is to provide a method that reduces the time needed for a dark current test while checking for image sensor pixel defects.

A still further objective of the present invention is to improve the accuracy of the PTC and dark current tests by implementing an exposure matrix in a "snap shot mode".

These objectives are achieved in one embodiment wherein a sensor area in an imaging device is comprised of a plurality of pixels arranged in "m" rows and "n" columns. The sensor area is tested by exposing with an illuminator that directs photons at the plurality of pixels. The illuminator is connected to a light source control in the tester apparatus used to perform the chip test. The device being tested is also linked to other components of the tester including digital boards, a frame grabber, power supplies, and auxiliary instruments. The tester is controlled by an external tester control unit such as a computer that may also function as an image processor.

In a preferred sequence of events, the test comprises exposing the sensor area in a snap shot mode which is a single image acquisition mode with pre-programmable settings that are contained in the tester control unit. In the exemplary embodiment, a first plurality of pixel rows are exposed to light for "x" microseconds (μs), a second plurality of rows are exposed for "2x" μs, a third plurality of rows are exposed for "3x" μs, a fourth plurality of rows are exposed for "4x" μs, and a fifth plurality of rows are exposed for a certain length of time that essentially saturates the sensor and represents a maximum output level. The first through fifth plurality of rows are configured sequentially from the top to the bottom of the frame. This process would result in a frame (image) that has regions of different brightness and progressively higher brightness moving from the top to the bottom of the frame. In another aspect, a certain number of columns of pixels may be exposed in a sequential manner with increasing exposure times from one side to the other side across the frame to give a plurality of regions of various brightness. In another embodiment, there may be "n" different exposures per frame each with a different exposure time "t" such that a first plurality of pixels are exposed for a time $t_1$, a second plurality of pixels are exposed for a time $t_2$, a third plurality of pixels are exposed for a time $t_3$, and so forth up to the nth plurality of pixels exposed for a time $t_n$ wherein $t_n > t_3 > t_2 > t_1$ and the relative length of exposure times may involve multipliers other than integers. For example, $t_3$ may be 2.5 times greater than $t_2$, and $t_n$ may be 3.7 times greater than $t_3$. Optionally, a rolling shutter mode may be used for image acquisition rather than the snap shot mode.

The photon transfer curve test comprises photons impinging on the photo gate of selected pixels and thereby discharging a pre-set voltage in proportion to the amount of incident light on the photo gate. The remaining voltage in the photo gate is transferred to a storage node (capacitor) in the imaging device. The voltage level for each pixel is obtained by a frame grabber component in the tester and is then read out line by line to an image processing unit. To calculate the PTC parameter, only two frames (F1 and F2) are necessary so that a difference frame (F2−F1) can be calculated in the image processing unit. Thus, a term called the difference_sigma (exp) can be determined by taking into account the difference for each pixel in F1 and F2. A third frame is grabbed for a dark current test after the photo gate is reset to its original pre-charged state. This step involves the same exposure time settings as used for F1 and F2 but without illumination in order to determine the parasitic leakage of the storage node. Therefore, the throughput of the PTC and dark current tests have been improved at least fivefold because of the large number of frames (15 or more) required for image sensor testing has been reduced to only three frames.

DETAILED DESCRIPTION OF THE INVENTION

The present invention is a method of improving the throughput of the photon transfer curve (PTC) test and dark current test when checking the reliability of pixels in an image sensor device. The drawings are provided by way of example and are not intended to limit the scope of the invention. The terms "exposure" and "illumination" may be used interchangeably.

The inventors have previously practiced a PTC and dark current test method wherein between five and ten different illumination levels involving two frames each are used to provide PTC measurements, and an additional set of frames (5 to 10) without illumination are needed for dark current calculations. For example, in FIG. 1, images 10-14 resulting from five different exposure times (illumination levels) during a PTC test are illustrated. In other words, the illumination portion of the PTC test has been divided into steps such that each pair of two frames is uniformly illuminated for a certain time. The illumination time varies so that the brightness is different in each of the resulting five images 10-14. The frames may be illuminated in any order. In one step, a sensor area (not shown) having a plurality of pixels configured in "m" columns and "n" rows is exposed for a first length of time ($a_1$) to produce an image 10 such that the output level of the sensor and each pixel is only a small fraction of the maximum output. Maximum output (14a in FIG. 2) is defined as the saturation point where a white image 14 is generated. In other steps, images 11, 12, 13 are produced by illuminating the plurality of pixels with increasingly greater exposure times $a_2$, $a_3$, and $a_4$, respectively, using the same intensity (photon flux) from an illuminator that is positioned to direct light at the sensor area. In a fifth step, a very long exposure time ($a_5$) is used to essentially saturate the sensor and produce an output that is a white image 14. Each step comprises generating a first frame at a certain illumination condition, resetting the photo gate to a precharged state, and then generating a second frame at the certain illumination condition. Two frames are averaged to give each image 10-14. Moreover, the remaining charge on the photo gate after each exposure period is transferred to a storage node (capacitor) where data can be read out pixel line (row) by pixel line (row) to an image processor where the pixel data is collected and an image is displayed. Typically, each step is further comprised of a dark current test component where the photo gate is reset to a precharged state following the second frame, and a third frame is generated for the same time period but with no illumination.

Figure 2:
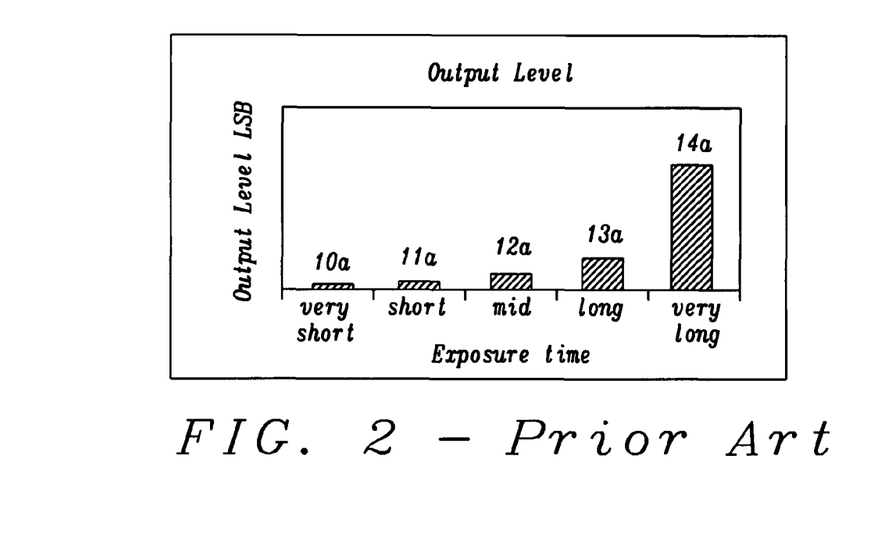
FIG. 2 is a bar graph showing the output level from each of the five different exposure times in FIG. 1.

Referring to FIG. 2, the relative outputs 10a-14a used to generate the images 10-14, respectively, are depicted. Exposure times are usually in microseconds (μs) and may vary depending on the resolution and speed of the sensor.

Figure 3:
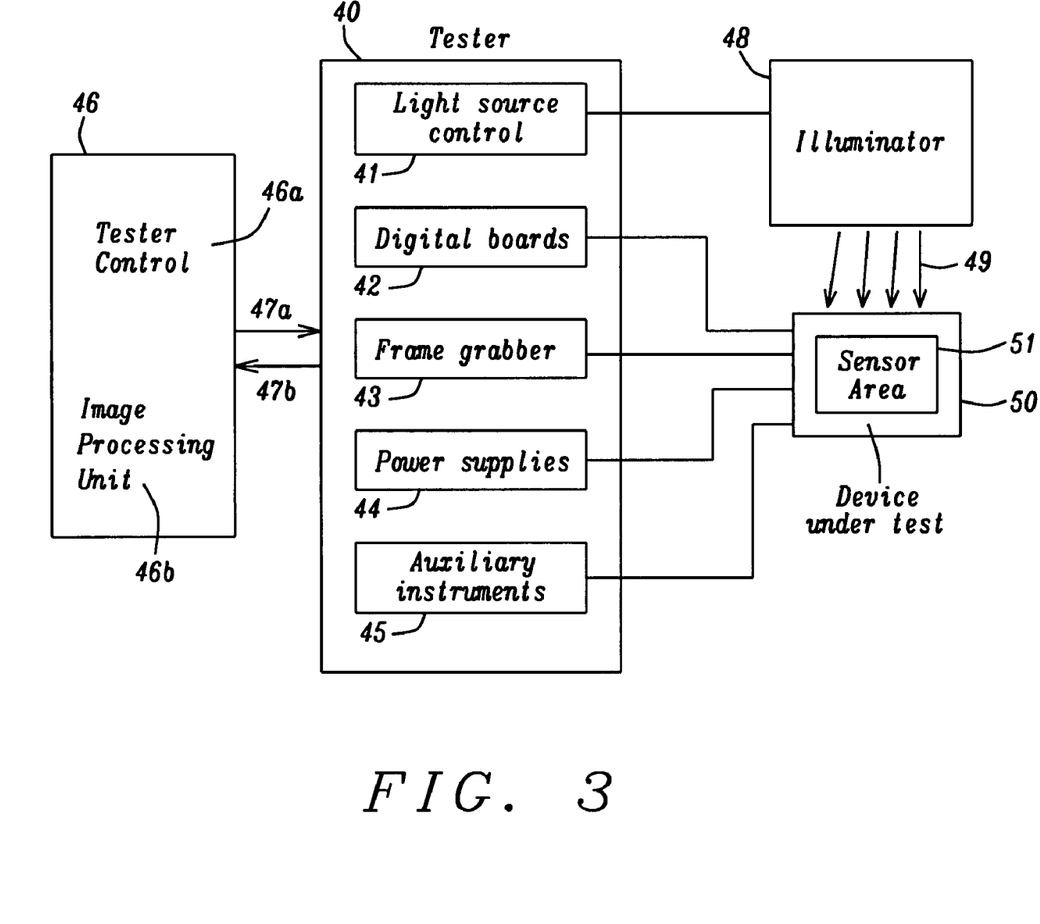
FIG. 3 is a block diagram that shows a test configuration that may be used to perform a PTC and dark current test on an image sensor device according to the present invention.

Referring to FIG. 3, the layout of a PTC and dark current test is depicted. A test system 40, dedicated for image sensor testing in general consists of a light source control 41, digital boards 42, a frame grabber 43, power supplies 44, and auxiliary instruments 45. The manufacturer and performance specifications may vary for each instrument from test system to test system. The light source control 41 is connected to an illuminator 48 based on Tungsten or LED illumination that emits broad band light 49 which exposes the sensor area 51 of a device 50 being tested. The charge remaining in a photo gate (not shown) of an exposed pixel is transferred after each exposure to a storage capacitor (not shown) in the device 50 and is read out according to a certain protocol to a frame grabber as is understood by those skilled in the art. For example, if the exposure rate is 1 frame per 1/30 of a second and each frame consists of "s" rows of pixels, then the read out rate of pixel information will be about 30 s rows per second.

In one embodiment, the frame grabber 43 operates in a snap shot mode which is a special mode, unlike the normal video mode that generates a continuous image stream, where several settings such as exposure and gain can be set in advance. On a certain signal, the sensor pixels are reset and the sensor is exposed to light by using the preprogrammed settings. Only one image is streamed out in this mode. After all the commands are executed to generate a plurality of images by repeating the snap shot mode a plurality of times, the operation of the sensor is stopped and it returns to an idle mode. The present invention also encompasses an image generating process wherein the frame grabber 43 operates in a normal video mode such as a rolling shutter mode. However, the normal video mode may be more difficult to implement in the "on chip" test method described herein.

The frame grabber 43 may start acquiring images based on synchronization signals such as VSYNC (vertical synchronization signal; start of frame/end of frame), HSYNC (horizontal synchronization, start of line, end of line), and Pixel clock (pixel data synchronization signal). Mainly parallel data are acquired on the data channels while HSYNC and VSYNC are "valid" (both together high or low—depending on the design). In both snap shot and continuous video modes, the frame grabber collects the binary information of the parallel data channels and stores the information in data arrays that are essentially memory in a personal computer (PC) where the image processing algorithms can perform the calculations.

Digital boards 42 are used to communicate with the device and program registers, and set various states of the digital device pins such as enable pins, reset signals, snap shot start signal, and others as appreciated by those skilled in the art. The power supplies 44 serve to supply the device under test with the required voltages and currents. Auxiliary instruments 45 comprise wave form generators, time measurement units, relay matrix, and various other instruments which are mainly required to test the functionality of a device. Although auxiliary instruments are not required for the PTC test, they are used in the overall test flow that a sensor device must pass.

The tester control (test program) 46a inputs commands 47a such as execution of measurements, communication with the device, changing the state of pins, and activating the frame grabber 43 when the frame grabber is waiting for the HSYNC/VSYNC valid states to start the data acquisition to the tester 40. Image processing unit 46b receives input 47b such as a data array containing the binary information of the acquired image from the tester 40, or measurement results from the instrument that was used for data collection. In one aspect, the tester control 46a is essentially a test program that runs on a PC or a similar control unit. The image processing may be performed on the PC (process control unit 46) that runs the tester control 46a but it could also run on separate dedicated hardware such as a multi-processor unit that does massive parallel operations and calculations.

Figure 1:
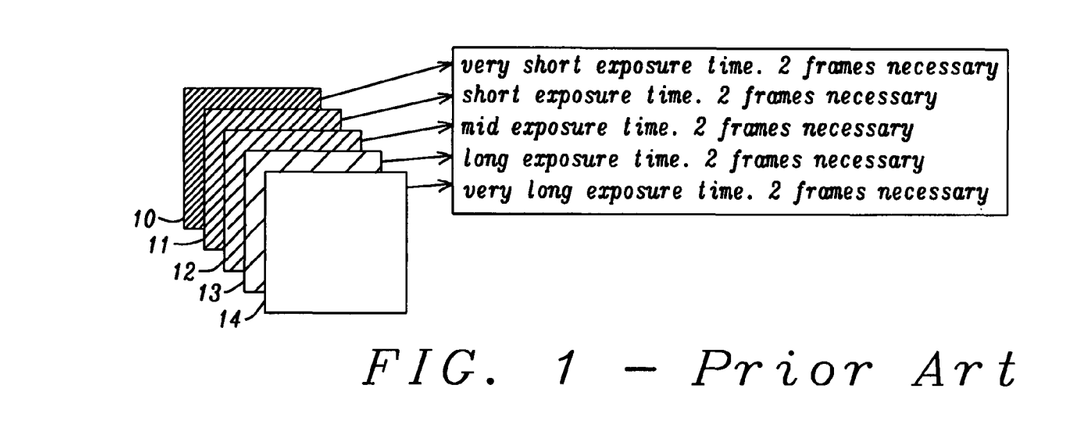
FIG. 1 is a diagram showing a conventional PTC test involving a set of five images generated with different exposure times and two frames each in which the exposure time is uniform for each pixel row over the entire frame.
Figure 4:
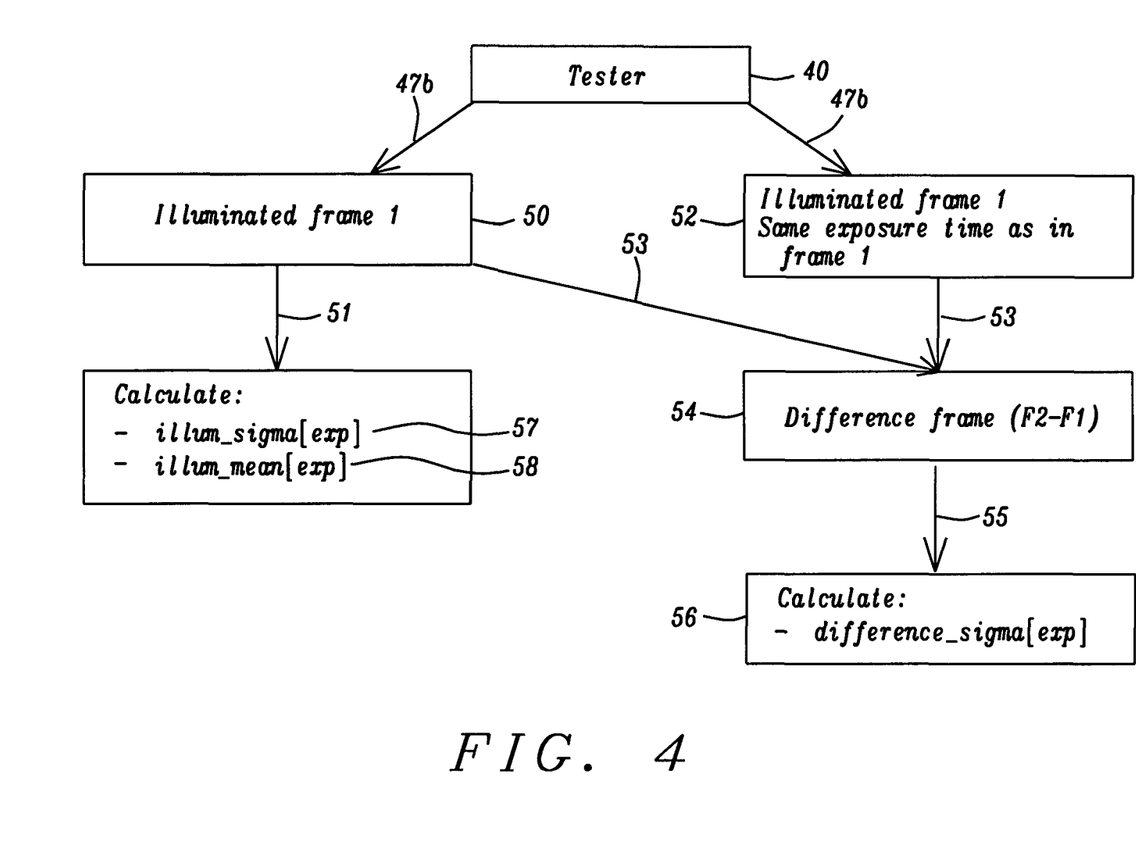
FIG. 4 is a flow diagram that shows how two frames from each of the five different exposure times in FIG. 1 may be used to calculate sigma, mean, and difference values.

In FIG. 4, a flow diagram illustrates how the process control unit 46 described previously uses input data 47b from the tester 40 to calculate values that characterize the sensor being tested. An illuminated frame 1 (F1) hereafter referred to as frame 50 is provided and data therein is processed in step 51 to calculate a sigma value shown as illum_sigma[exp] 57 and a mean value shown as illum_mean[exp] 58. A second illuminated frame 2 (F2) hereafter referred to as frame 52 is also provided. In step 53, frame 50 and frame 52 data are used to calculate a difference (F2−F1) frame 54. The difference frame 54 can be further used by a program known to those skilled in the art to calculate a sigma difference value 56 shown as difference_sigma[exp]. This process flow is repeated for each illumination step in the PTC test. For instance, when five different exposure times are employed to form the images 10-14 in a conventional test, then the process flow in FIG. 4 is repeated five times and applied to data from each set of two frames needed to generate a particular image. If there are five different exposure times ($a_1$-$a_5$), then a total of five difference frames 54 are generated.

Figure 5:
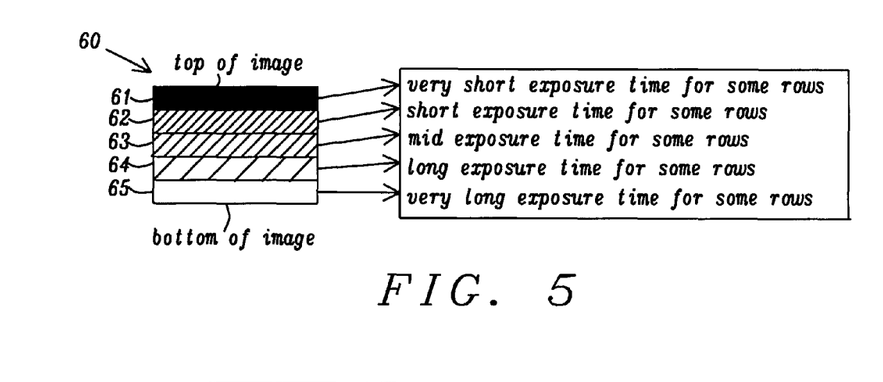
FIG. 5 is an image generated by a PTC test involving a single image acquisition mode wherein two frames are each produced by 5 different exposure times according to a method of the present invention.

Referring to FIG. 5, the inventors have discovered a new method of performing the PTC and dark current tests that substantially reduces the time required for pixel testing. According to the exemplary embodiment of the present invention, an image may be generated that is comprised of five rectangular regions 61-65 wherein each region represents an output from a certain number of pixel rows in a sensor area being tested. For instance, region 61 is located at the top of the image 60 and results from a very short exposure time $t_1$ of a first plurality of pixel rows. Similarly, region 62 results from a somewhat longer exposure time $t_2$ on a second plurality of pixels rows, and so forth through region 65. Regions 62-65 result from progressively greater exposure times $t_2$, $t_3$, $t_4$, and $t_5$, respectively, such that $t_5 > t_4 > t_3 > t_2 > t_1$ and $t_5$ essentially saturates the corresponding pixel region (fifth plurality of pixel rows) to produce a maximum output level and a white image. For example, $t_2$ may be 2× greater than $t_1$, $t_3$ may be 3× greater than $t_1$, and $t_4$ may be 4× greater than $t_1$. Each region 61-65 results from an exposure of a certain plurality of pixel rows in the sensor area being tested. Data is preferably handled according to a snap shot mode of operation that is well known to those skilled in the art and was mentioned previously. The snap shot mode is a single acquisition mode with a pre-programmable setting stored in the device registers (not shown). It should be understood that the pre-programmable settings in the device registers can be modified to enable a plurality of exposure times within one frame.

Alternatively, the image 60 may be comprised of a plurality of rectangular shaped regions, wherein the degree of brightness increases progressively from the bottom to the top of the image. In still another embodiment, there may be "n" different exposures per frame each with a different exposure time "t" such that a first plurality of pixels are exposed for a time $t_1$, a second plurality of pixels are exposed for a time $t_2$, a third plurality of pixels are exposed for a time $t_3$, and so forth up to the nth plurality of pixels exposed for a time $t_n$ wherein $t_n > t_3 > t_2 > t_1$ and $t_n$ essentially saturates the nth plurality of pixels to produce a white image in the nth region of the image that corresponds to the nth pixel region. Moreover, the relative length of exposure times may involve multipliers other than integers. For example, $t_3$ may be 2.5 times greater than $t_2$, and $t_n$ may be 3.7 times greater than $t_3$.

Figure 6:
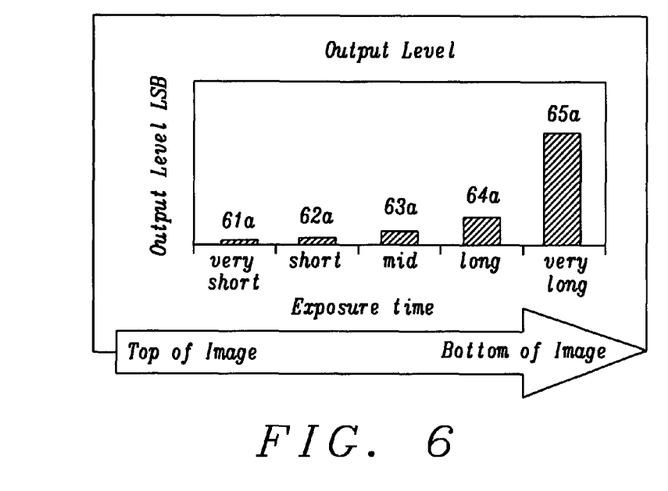
FIG. 6 is a bar graph that depicts the output level generated from each of the five different exposure times in FIG. 5.

Referring to FIG. 6, the magnitude of the output level in Least Significant Bits (LSB) used to generate image 60 is shown as a function of exposure time. The output level is a value 61a for region 61, a value 62a for region 62, a value 63a for region 63, a value 64a for region 64, and a value 65a for region 65 wherein value 65a essentially represents a condition where the sensor is saturated and a white image (maximum output) is produced in region 65. Note that the illumination intensity from the illuminator 48 remains constant and only the exposure times vary to produce the different values 61a-65a. This condition allows a higher accuracy in the PTC test measurements than if the illumination intensity were to vary from one plurality of pixels to the next across the frame. A small improvement in accuracy may also be realized compared with the conventional PTC test represented in FIGS. 1-2.

Returning to FIG. 3, according to the present invention, a register (not shown) from the tester control 46a section of the process controller 46 is modified to set the number of exposure steps between maximum and minimum exposure in the device. A register is defined as a digital block in the chip where information (i.e. settings) can be stored in a binary format. The number of exposure steps and the duration of each step are transferred in step 47a to the device under test 50 normally by using a digital board 42 of the testor 40. Those skilled in the art will appreciate that each exposure step is used to generate a particular region 61-65 (FIG. 5). Therefore, the number of exposure steps between the maximum exposure (the step used to illuminate the fifth plurality of pixels that generates region 65) and the minimum exposure (the step used to illuminate the first plurality of pixels to produce region 61) is three in the exemplary embodiment. Optionally, there may be a total of "n" different exposures to produce "n" different light intensity regions on the resulting image. It should be understood that the "n" different exposures used to generate a first frame 50 must be repeated to produce a second frame 52 in order to calculate the (F2-F1) difference frame 54 in FIG. 4. Note also that the photo gate for each pixel is reset to a precharged state after each frame is generated.

Each exposure step involves exposure of a certain number of rows of pixels in the sensor area 51. In one embodiment, region 61 is generated from an exposure of $x_1$ pixel rows, region 62 from exposing $x_2$ pixel rows, region 63 from exposing $x_3$ pixel rows, region 64 from exposing $x_4$ pixel rows, and region 65 from exposing $x_5$ pixel rows wherein $x_1$, $x_2$, $x_3$, $x_4$, $x_5$ are all integers and are equivalent. However, the present invention also encompasses an embodiment wherein one or more of the integers $x_1$-$x_5$ are unequal.

It is understood that each pixel in the image sensor (not shown) has a photo gate at the bottom of its light column that is charged with a certain voltage and is electrically connected to a charge integrator. The amount of photons incident on the photo gate is related to the amount of discharge from the photo gate. The amount of charge remaining at a photo gate after a certain exposure can be transferred to a storage node (capacitor) and read out by the image processing unit 46b (via the frame grabber 43) at a later time. The charge integrator in the image sensor generates an output based on the amount of charge received from the photo gate.

During the dark current test, the same exposure times and number of exposure steps employed to produce frames 50 and 52 are used for a third data generation sequence. The photo gate for each pixel is reset to a precharged state after data for frame 52 is collected and then a third "dark" frame is generated by setting the illumination to zero intensity for a certain time period equivalent to that used for the previous frame 52. For example, in an embodiment where "n" different pixel regions are used to generate frame 52, a third frame is produced by a process comprising the following steps. The residual charge in the storage node for each pixel in the first pixel region is transferred to a photo gate after a time period $t_1$; the residual charge in the storage node for each pixel in the second pixel region is transferred to a photo gate after a time period $t_2$, and so forth up to a final step of transferring the residual charge in the storage node for each pixel in the nth pixel region to a photo gate after a time period $t_n$. This process allows the parasitic leakage from the storage node in each pixel to be determined while the image sensor is in a dark state. Data is preferably collected as before in a snap shot mode and transferred to the image processing unit 46b via the frame grabber 43.

A total of 3 frames are required to test each image sensor according to the present invention because only two frames are necessary for the PTC test and just one additional frame is employed for the dark current test. The test method described herein achieves a substantial savings in time and cost for image sensor testing compared with prior art methods where a total of 15 frames would be needed to complete a PTC and dark current test that involves 5 different exposure levels. Not only is data acquisition faster than before but data processing is faster since less data input is received from three frames than from 15 frames in the prior art. The method of the present invention can be performed with existing equipment that can be easily modified by downloading software with settings for exposure times and number of exposure increments per frame.

While this invention has been particularly shown and described with reference to, the preferred embodiment thereof, it will be understood by those skilled in the art that various changes in form and details may be made without departing from the spirit and scope of this invention.

I claim:

1. An on-chip test method for photon transfer curve and dark current testing to determine pixel reliability in an image sensor device, comprising:
   (a) providing a substrate and a sensor array having a plurality of pixels rows and columns formed thereon wherein each pixel is comprised of a charged photo gate at the base of a light column and a capacitor (storage node) for storing charge transferred from the photo gate, said substrate is linked to a tester device;
   (b) exposing the sensor array with a uniform light source such that a first plurality of $x_1$ pixels in a first region are exposed for a time period $t_1$ in a first step, a second plurality of $x_2$ pixels in a second region are exposed for a time period $t_2$ in a second step, and so forth up to an nth plurality of $x_n$ pixels in an nth region exposed for a time period $t_n$ in an nth step wherein the total of $x_1+x_2+\ldots x_n$ pixels equal a frame, and the time period becomes greater in successive steps such that $t_n > t_2 > t_1$;
   (c) transferring a residual charge in the photo gate to a capacitor for each pixel and subsequently sending residual charge information for each pixel to an image processor where an image for a first frame (F1) is generated, said image has a top and bottom and two sides;
   (d) resetting the photo gate to the same charged state as in step (a);
   (e) repeating steps (b)-(d) in succession to form an image having a top and bottom and two sides for a second frame (F2) in said image processor wherein illumination values for F1, F2, and (F2−F1) may be calculated and a difference frame (F2−F1) determined;
   (f) resetting the photo gate to the same charged state as in step (a); and
   (g) generating a third frame with no illumination to determine the dark current contribution by transferring the residual charge in the photo gate for each pixel in the first region after a time period $t_1$, in the second region after a time period $t_2$, and so forth up to the nth region after a time period $t_n$.

2. The method of claim 1 wherein the exposure period $t_n$ for the nth plurality of pixels essentially saturates said nth plurality of pixels to produce a white region in said images for the F1 and F2 frames.

3. The method of claim 2 wherein the exposure period $t_1$ for the first plurality of pixels produces a substantially black region in said images for the F1 and F2 frames.

4. The method of claim 3 wherein the substantially black region is formed at the top of said images and the essentially white region is formed at the bottom of said images and the exposures having time periods between $t_1$ and $t_n$ produce successively brighter regions between the top and bottom of said images wherein the brightness increases as the time period increases in length.

5. The method of claim 1 wherein each of the "n" regions has the same number of pixels and $x_1=x_2=x_n$.

6. The method of claim 1 wherein one or more of the values $x_2, \ldots x_n$ are unequal to the value $x_1$.

7. The method of claim 1 wherein the time periods $t_1, t_2, \ldots t_n$ are determined based on the resolution and speed of the sensor.

8. The method of claim 1 wherein sending residual charge information for each pixel to an image processor in step (c) occurs through a frame grabber component of the tester device.

9. The method of claim 1 wherein the exposures are performed in a rolling shutter mode.

10. The method of claim 1 wherein the exposures are performed in a snap shot mode.

11. An on-chip test method for photon transfer curve and dark current testing to determine pixel reliability in an image sensor device, comprising:
    (a) providing a substrate and a sensor array having a plurality of pixels rows and columns formed thereon wherein each pixel is comprised of a charged photo gate at the base of a light column and a capacitor (storage node) for storing charge transferred from the photo gate, said substrate is linked to a tester device;
    (b) exposing the sensor array with a uniform light source such that a first plurality of $x_1$ pixel rows are exposed for a time period $t_1$ in a first step, a second plurality of $x_2$ pixel rows are exposed for a time period $t_2$ in a second step, and so forth up to an nth plurality of $x_n$ pixel rows exposed for a time period $t_n$ in an nth step wherein $x_1$-$x_n$ are integers and the total of $x_1+x_2+\ldots x_n$ pixel rows equal a frame, and $t_n>t_2>t_1$;
    (c) transferring a residual charge in the photo gate to the capacitor for each pixel and subsequently sending residual charge information for each pixel to an image processor where an image for a first frame (F1) is generated, said image has a top and bottom;
    (d) resetting the photo gate to the same charged state as in step (a);
    (e) repeating steps (b)-(d) in succession to form an image having a top and bottom for a second frame (F2) in said image processor wherein illumination values for F1, F2, and (F2−F1) may be calculated and a difference frame (F2−F1) determined;
    (f) resetting the photo gate to the same charged state as in step (a); and
    (g) generating a third frame with no illumination to determine the dark current contribution by transferring the residual charge in the photo gate for each pixel in the first plurality of pixel rows after a time period $t_1$, in the second plurality of pixel rows after a time period $t_2$, and so forth up to the nth plurality of pixel rows after a time period $t_n$.

12. The method of claim 11 wherein the exposure period $t_n$ for the nth plurality of pixel rows essentially saturates said nth plurality of pixel rows to produce a white region in said images for the F1 and F2 frames.

13. The method of claim 12 wherein the exposure period $t_1$ for the first plurality of pixel rows produces a substantially black region in said images for the F1 and F2 frames.

14. The method of claim 13 wherein the substantially black region is formed at the top of said images and the essentially white region is formed at the bottom of said images and the exposures having time periods between $t_1$ and $t_n$ produce successively brighter regions between the top and bottom of said images wherein the brightness increases as the time period increases in length.

15. The method of claim 11 wherein the exposures are performed in a snap shot mode.

16. The method of claim 15 wherein a register in a process control unit is used to set the number of steps in the snap shot mode during exposure of the sensor area.

17. The method of claim 11 wherein the number of pixel rows exposed in each step are equivalent and $x_1 = x_2 = x_n$.

18. The method of claim 11 wherein the time periods $t_1, t_2, \ldots t_n$ are determined based on the resolution and speed of the sensor.

19. The method of claim 12 wherein sending residual charge information for each pixel to an image processor in step (c) occurs through a frame grabber component of the tester device.

20. The method of claim 11 wherein the exposures are performed in a rolling shutter mode.

* * * * *